April 6, 1926.  W. I. RAYMOND  1,579,841
TRAP
Filed April 13, 1925
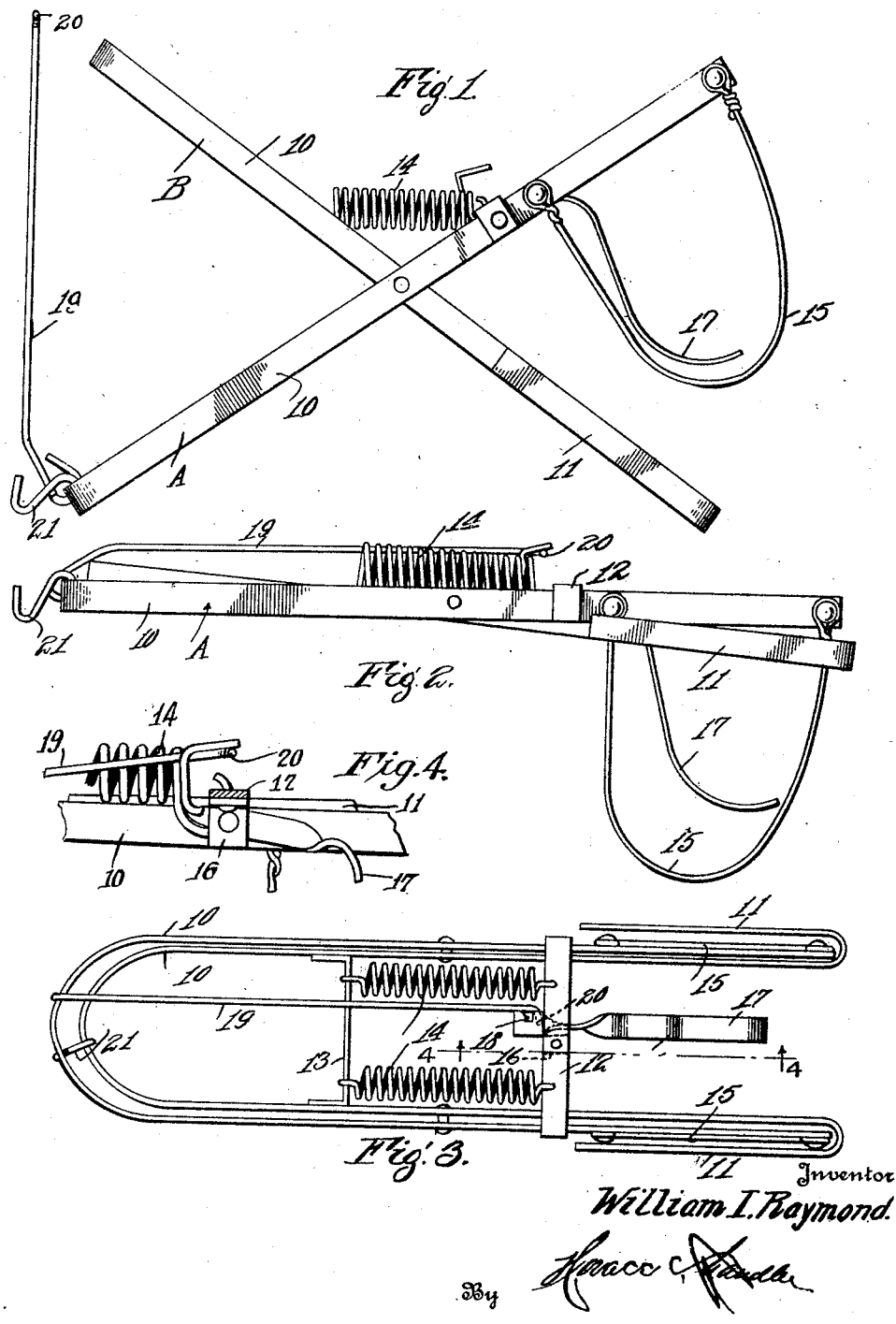
Inventor
William I. Raymond.
By Horace C. [signature]
Attorney Patented Apr. 6, 1926.

1,579,841

UNITED STATES PATENT OFFICE.

WILLIAM I. RAYMOND, OF PORTLAND, OREGON, ASSIGNOR OF ONE-HALF TO GUY M. RAYMOND, OF PORTLAND, OREGON.

TRAP.

Application filed April 13, 1925. Serial No. 22,742.

*To all whom it may concern:*

Be it known that I, WILLIAM I. RAYMOND, a citizen of the United States, residing at Portland, in the county of Multnomah, State of Oregon, have invented certain new and useful Improvements in Traps; and I do hereby declare the following to be a full, clear, and exact description of the invention, such as will enable others skilled in the art to which it appertains to make and use the same.

This invention relates to new and useful improvements in animal traps, and particularly to traps used for catching moles, gophers, and the like burrowing animals.

One object of the invention is to provide a trap which is arranged to be placed in the tunnel burrowed by the animal, and constructed and arranged to effectively close on the animal, upon passage therethrough by the animal.

Another object is to provide a strong and durable trap of this character, and one having a novel and efficient tripping mechanism, whereby to insure the proper grip on the animal, when released by the animal.

Other objects and advantages will be apparent from the following description when taken in connection with the accompanying drawing.

In the drawing:

Figure 1 is a side elevation of the trap in open position.

Figure 2 is a similar view in closed position.

Figure 3 is a top plan view of the trap in closed or set position.

Figure 4 is a longitudinal sectional detail view on the line 4—4 of Figure 3.

Referring particularly to the accompanying drawing, A and B represent the members of the trap, each of which comprises a metal yoke or U-shaped member 10, the ends of the arms of one of which are bent back on the outer faces thereof, as shown at 11, for a purpose which will presently appear. Each of the arms of the members 10 is pivoted to the corresponding arm of the other member, as shown in the drawing, suitable spacing strips 12 and 13 being secured to and extending between the arms of the respective members 10. It will be noted that the bracing strip 12 is spaced outwardly from the pivotal connection of the members 10, while the strip 13 is spaced inwardly thereof, toward the bight of the member 10. Connected at their opposite ends to the bracing strips 12 and 13 are the strong coil springs 14, which swing the members 10, on their pivots, to move the free ends of the members away from each other. Secured to the free ends of the arms of one of the members 10 are the loops 15, said loops extending at right angles therefrom, and in parallel relation to each other, said loops being received in the bent portions of the other member 10, when said other member is swung into set position. Secured to the bracing strip 13, intermediate its length, is an angle bracket 16, and pivotally mounted on this bracket is a curved arm 17, the curved portion of which extends outwardly between the loops 15, and is curved in conformity to, and lies in the same plane as one side of the loops. The other end of the arm 17 is bent to extend in parallel relation to the other face of the strip 13, and has a notch 18 in one of its side edge portions. Pivotally carried by the bight portion of the member 10 which carries the arm 17 is an arm 19, of sufficient length to extend into position to engage its laterally turned end 20 behind the last-named end of the arm 17, said arm 19 bearing against the bight portion of the other member 10, and retaining said member nested within the first member, and the bent ends 11 in straddling relation to the corresponding ends of the arms of the other member 10.

The bight portion of the member A is provided with a hook 21 which is adapted to be engaged with the bight portion of the member B, when the trap is set, so that the trap can be safely carried in such condition.

In setting the trap, the bight portions of the members A and B are grasped and the members rocked until the bent ends 11 straddle the corresponding ends of the other member. The arm 19 is grasped and swung to lie longitudinally of the members A and B, and its laterally turned end 20 passed through the notch 18, and engaged behind the notched end of the curved arm 17. The trap is placed with its wire loops 15 in the soil, within the channel or groove dug by the animal to be caught. As the animal passes through the loops 15, it comes in contact with the curved arm, whereupon said arm will be moved on its pivot to cause the release of the arm 19, thus permitting the springs 14 to suddenly and forcibly swing the members A and B so that the animal will be gripped within the loops, and between the bent ends 11, of the arms of the member B, and the bight portions of the loops.

What is claimed is:

1. An animal trap including a pair of yokes disposed in nested relation and having the intermediate portions of the arms thereof pivotally connected, the free ends of the arms of one of the yokes being rebent outwardly of the arms and in spaced relation thereto, the corresponding ends of the arms of the other yoke being arranged to slide between said rebent portions and the arms of said yoke, loops carried by the said slidable ends of the arms of the first yoke, means for swinging the yokes on their pivot to confine an animal between the loops and the rebent portions, and means for holding the parts in set position and releasable by an animal.

2. An animal trap comprising a pair of nested and pivoted yokes, the free ends of the arms of one of the yokes being extended rearwardly in parallel relation to the main portions of the arms, the corresponding ends of the arms of the other yoke being arranged to move between the said parallel portions of the arms of the first yoke, loops carried by the arms of the second yoke and movable in unison with the arms of the yoke and cooperating with the said parallel portions to embrace an animal, spring means between the loop carried arms of the second yoke and the other yoke beyond the pivotal connection therebetween, an animal engaged trip extending across said loops and having a rebent end portion formed with a notch, and a lever carried by the second yoke engageable on the first yoke and having an end portion arranged to engage beneath said rebent portion and to escape through said notch upon movement of the trip.

In testimony whereof, I affix my signature.

WILLIAM I. RAYMOND.